(12) United States Patent
Barritt et al.

(10) Patent No.: US 7,252,297 B1
(45) Date of Patent: Aug. 7, 2007

(54) SAFETY WELDING CART

(75) Inventors: Dell Barritt, Lompoc, CA (US); Eugene Dewegeli, Arroyo Grande, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 213 days.

(21) Appl. No.: 11/120,215

(22) Filed: May 2, 2005

(51) Int. Cl.
*B62B 1/00* (2006.01)
(52) U.S. Cl. .............................. 280/47.26; 280/47.27; 280/79.5; 280/79.6; 280/79.7
(58) Field of Classification Search ............. 280/47.26, 280/47.27, 79.7, 79.5, 79.6; 219/136, 137.9
See application file for complete search history.

(56) References Cited
U.S. PATENT DOCUMENTS

| | | | | |
|---|---|---|---|---|
| 3,194,943 A | * | 7/1965 | Flora | 219/73.2 |
| 4,625,949 A | * | 12/1986 | Walker | 266/48 |
| 5,570,895 A | * | 11/1996 | McCue et al. | 280/47.19 |
| 6,116,623 A | * | 9/2000 | Salvucci | 280/47.26 |
| 6,590,184 B1 | * | 7/2003 | Andersen | 219/136 |
| 6,930,282 B1 | * | 8/2005 | Di Novo et al. | 219/137.9 |

* cited by examiner

*Primary Examiner*—Christopher P. Ellis
*Assistant Examiner*—Cynthia F. Collado
(74) *Attorney, Agent, or Firm*—Kenneth E. Callahan

(57) ABSTRACT

A safety welding cart structure having a metal box for holding pressurized gas cylinders, a firewall separating the cylinders, individual clamping devices to secure the cylinders, and shelves extending from the back of the box forming a cart set upon a four-wheeled base, which includes two positive-locking swivel casters. The regulators are contained within a ventilated cabinet and the hoses are wound about a reel.

1 Claim, 4 Drawing Sheets

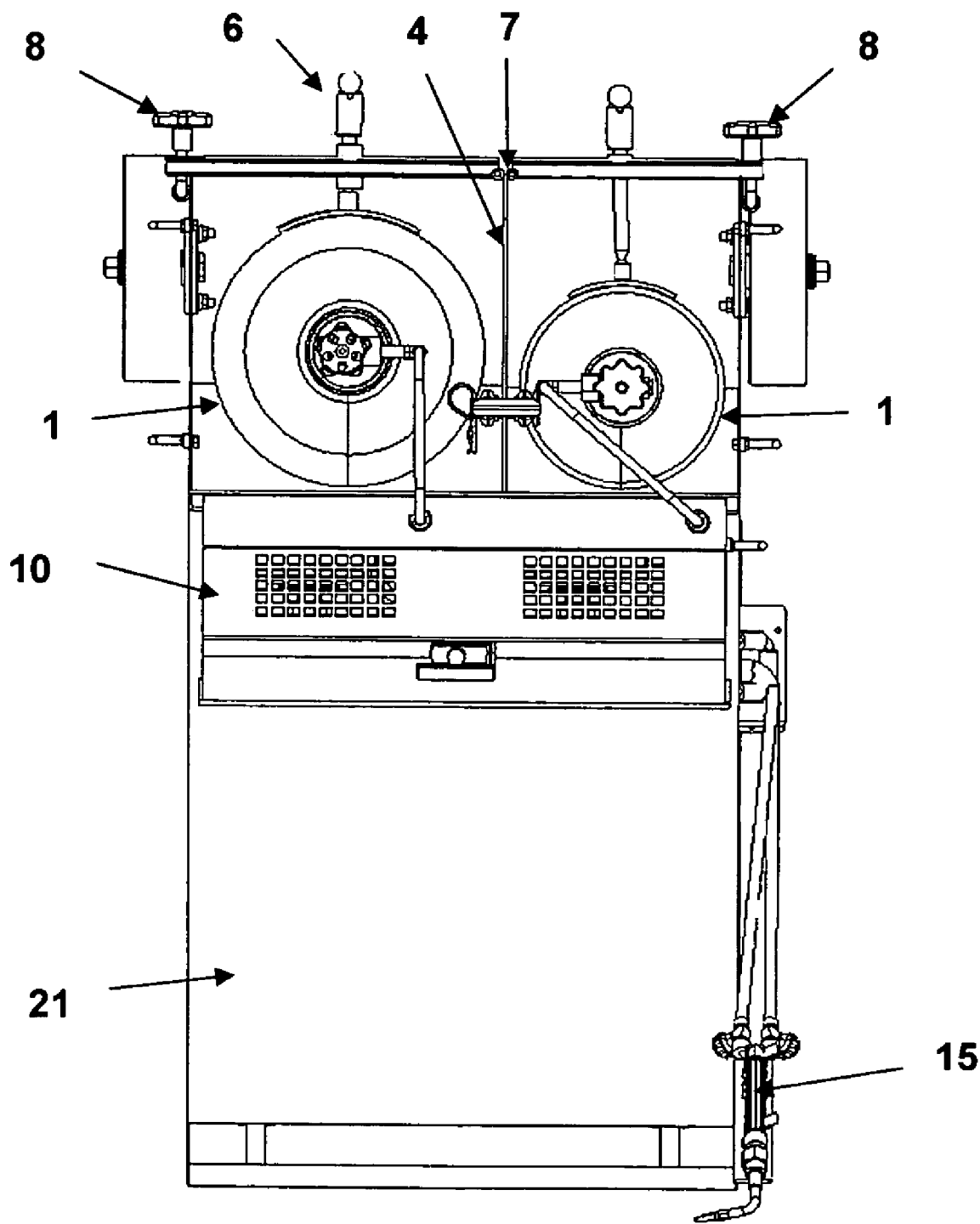
FIG. 4 (Top View)

SAFETY WELDING CART

STATEMENT OF GOVERNMENT INTEREST

The conditions under which this invention was made are such as to entitle the Government of the United States under paragraph l(a) of Executive Order 10096, as represented by the Secretary of the Air Force, to the entire right, title and interest therein, including foreign rights.

BACKGROUND OF THE INVENTION

The present invention relates generally to oxygen and fuel welding and cutting equipment and in particular to a cart to safely hold and protect such welding equipment.

Oxyacetylene gas welding and cutting sets are found in nearly every industrial shop in the world. A welding set usually consists of one 210-pound pressurized cylinder filled with 275 cubic feet of toxic acetylene gas and one 175-pound pressurized cylinder filled with 250 cubic feet of industrial oxygen at 2,500 psi standing side-by-side in a two wheeled tip-back style cart. On top of these cylinders are the exposed valves and regulators. The welding set includes twin rubber hoses connected to a mixing valve and torch tips.

Mishaps involving oxyacetylene gas-welding and cutting sets are usually catastrophic to anyone in the area often involving loss of property and life. If toppled over, a 175-pound pressurized oxygen cylinder with a broken regulator and/or valve can jet away at more than 30 miles an hour smashing through block walls and fly through the air reaching distances of more than a half-mile. It can spin, ricochet and smash through anything in its path. In addition to these hazards, the tip back style cylinder carts are dangerous because they are awkward and heavy to move around. The industry norm is to loosely hold these cylinders in the tip cart using a wrap-around chain. The cylinders can easily tip over and/or fall out of the cart in this configuration possibly causing harm to the person trying to move them. Lastly, excessive hose on the ground can be cut or damaged by falling objects and/or molten metal, can catch fire and burn up.

U.S. Pat. No. 4,625,949 disclosed a partial solution to the inherent safety problems associated with welding sets by placing the pressure and flow rate regulator dials in a ventilated box separate from the pressurized cylinders. However, the cylinder valves were still exposed and the tip-style cart was still employed. It would be advantageous to have a welding cart that could not be tipped over, physically separated the cylinders and protected the cylinder valves, and that could be locked into position.

SUMMARY OF THE INVENTION

An embodiment of the invention is designed to provide a safer oxyacetylene gas-welding cart that will reduce and or eliminate many of hazards of current designs. The design provides better protection for the compressed gas cylinders by including a ⅛ in. thick steel container, securing the cylinders to the cart with individual clamps that accommodate different cylinder diameters, providing a ⅛-inch steel firewall in between the gas cylinders, and mounting the regulators in a separate vented protective container. The cart is also a more stable platform that will not tip over due to a four-wheeled base that may includes two positive locking swivel casters, instead of a 2 wheeled tip-back cart. Also provided is a separate means of storage for hoses in the form of a hose reel that ensures only the amount of hose that is needed is exposed.

BRIEF DESCRIPTION OF THE DRAWINGS

FIG. 4 is a top view of the cart.

DESCRIPTION OF THE PREFERRED EMBODIMENT

Figure 1:
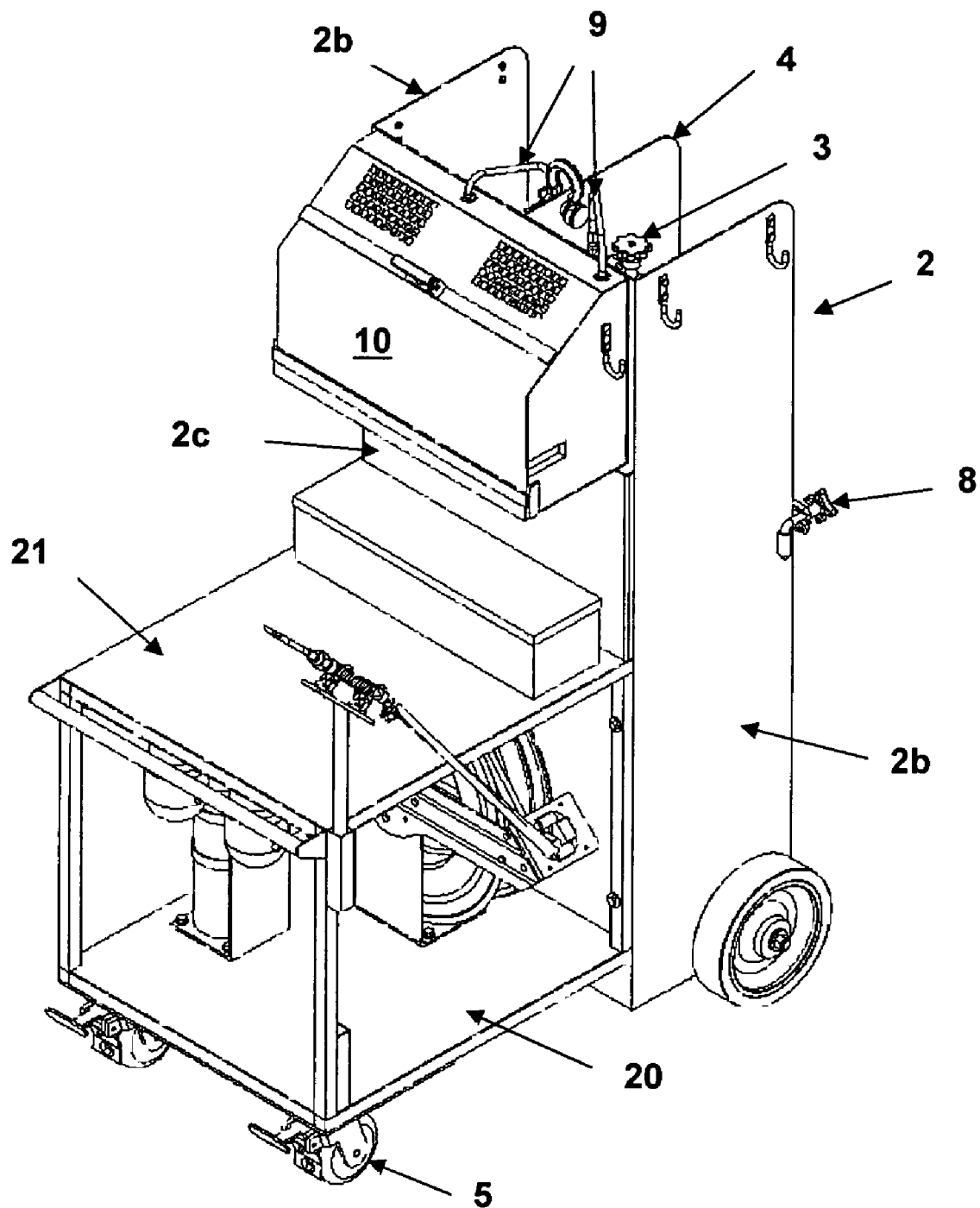
FIG. 1 shows a perspective view of the welding cart from the front side.
Figure 2:
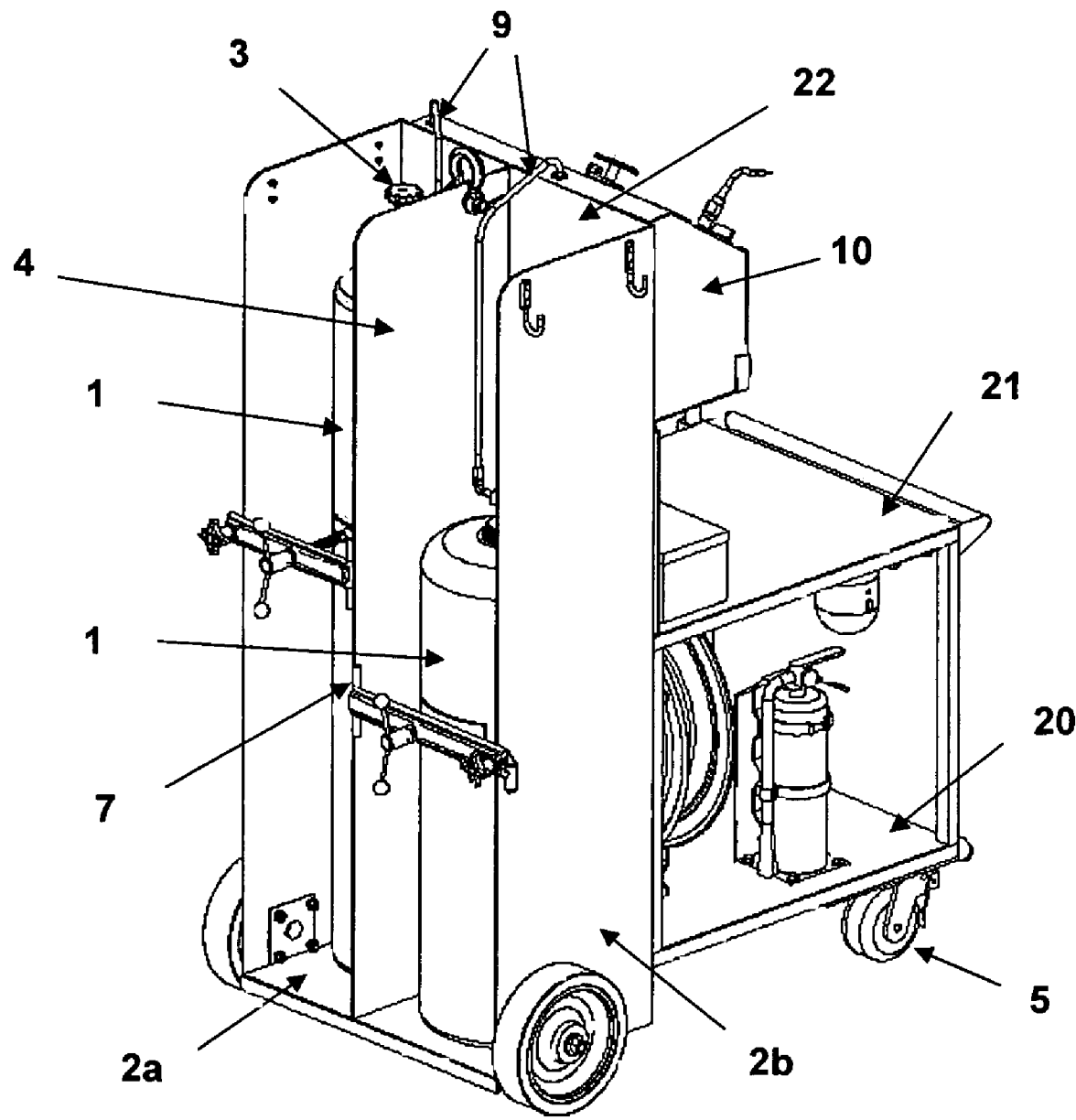
FIG. 2 shows a perspective view of the welding cart from the back side.
Figure 3:
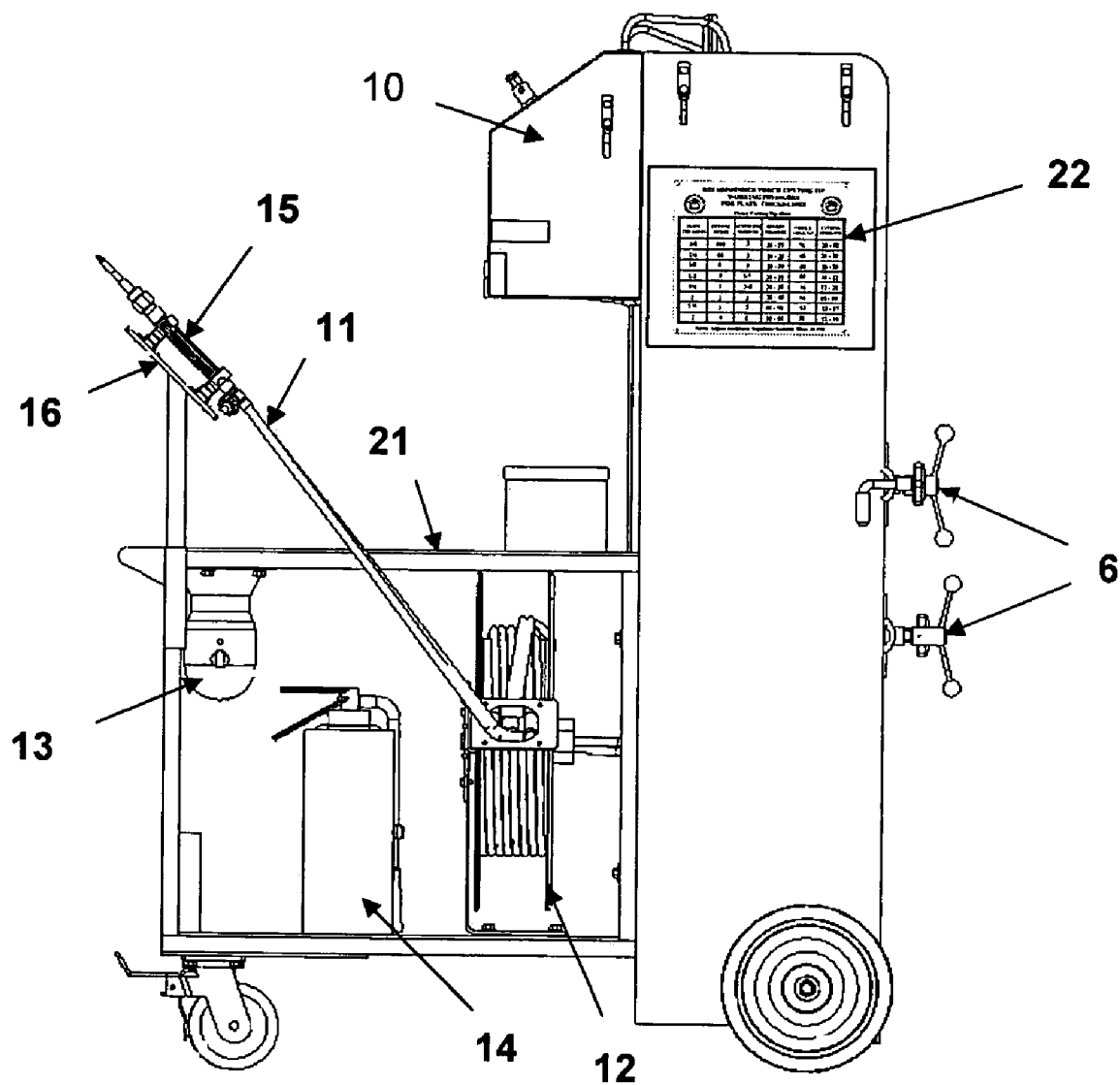
FIG. 3 is a side view of the cart.

The present invention is designed to address the primary safety concerns of welding carts. The basic design is shown in the perspective views of FIG. 1 and FIG. 2 and the side view of FIG. 3. The pressurized gas cylinders 1 are positioned inside a four-sided rectangular box 2 made of ⅛ inch steel. The rectangular box consists of a bottom 2a, two sides 2b, and a back 2c. The top and front of the box are open for ready access to the cylinders and for operating the valves 3 on the top of the cylinders. The box sides extend above the cylinder valves to protect them. A ⅛ inch steel firewall 4 is positioned between the gas cylinders 1. A lower 20 and an upper 21 shelf extends parallel to the floor and is attached to the back 22 of the rectangular box 2. This constitutes the basic structure of the cart. The cart sits on a four-wheeled base, which may include two wheels attached to the box sides 2a near the bottom of the box and two positive-locking swivel casters 5 attached the lower shelf 20, as opposed to the traditional two-wheeled tip-back cart. The gas cylinders 1 are securely held within the steel box by individual clamping devices and cradles 6 shown in the top view of FIG. 4. Individual clamping devices 6 are employed to accommodate gas cylinders of different diameters. The clamping devices are hinged 7 at the firewall 4 end and use torque handle nuts 8 at the other end.

Hoses 9 from each gas cylinder are led into a ventilated cabinet 10 where they are connected to regulators (not shown) that control and monitor pressure and flow rate. The two hoses 11 exiting the regulators are held on a hose reel 12. The mixing valve and torch tip 15 is held by a removable torch holding device 16 on the shelf above the reel 12. Provision is also made for storage of the gas cylinder valve caps 13 and for a fire extinguisher 14. Since the gas pressures and tip sizes vary according to the welding job, an engraved data placard 22 is also attached to the cart.

The scope of the invention includes all modification, design variations, combinations, and equivalents that would be apparent to persons skilled in the art, and the preceding description of the invention and its preferred embodiments is not to be construed as exclusive of such. For example, the safety welding cart could readily be adapted for gas cylinders used in a medical environment.

The invention claimed is:

1. A safety welding cart for use with oxygen-fuel welding and cutting equipment including a pressurized oxygen cylinder, a pressurized fuel cylinder, hoses, gas flow and pressure regulators, and a torch, comprising:

a rectangular metal box positioned vertically and having a bottom, two sides having a width at least the diameter of said cylinders and a height at least the height of said cylinders, and a back of suitable size to hold two pressurized cylinders;

a firewall of dimensions similar to said box sides positioned parallel to the box sides and approximately half way between said box sides, to thereby separating the two pressurized cylinders;

a lower and an upper shelf attached to the back of said box;

a wheel attached to each of said box sides near the box bottom and two positive-locking swivel caster wheels attached to the underside of said lower shelf, thereby forming a stable four-wheeled cart base;

individual clamping devices for each of said two pressurized cylinders, each clamping device having an adjustable cradle attached to a bar in contact with a cylinder whereby cylinders of different diameters may be accommodated, each of said clamping devices further being hinged at said firewall on a first end of said bar and being attachable to a side of said rectangular metal box by torque handle nuts at a second end of said bar;

a ventilated cabinet attached to the top of said box back for containing gas flow and pressure regulators; and a take-up reel for said hoses.

* * * * *